Sept. 6, 1966 P. DEFFRENNE 3,271,086
DEVICE FOR MAINTAINING CONSTANT THE DISTANCE
BETWEEN ADJACENT SURFACES OF A REFERENCE
BODY AND A MOVABLE BODY SUBJECT
TO A VARIABLE EXTERNAL FORCE
Filed Oct. 10, 1963 6 Sheets-Sheet 1

INVENTOR
PAUL DEFFRENNE

Sept. 6, 1966  P. DEFFRENNE  3,271,086
DEVICE FOR MAINTAINING CONSTANT THE DISTANCE
BETWEEN ADJACENT SURFACES OF A REFERENCE
BODY AND A MOVABLE BODY SUBJECT
TO A VARIABLE EXTERNAL FORCE
Filed Oct. 10, 1963  6 Sheets-Sheet 4

INVENTOR
PAUL DEFFRENNE
By

FIG. 7

3,271,086
DEVICE FOR MAINTAINING CONSTANT THE DISTANCE BETWEEN ADJACENT SURFACES OF A REFERENCE BODY AND A MOVABLE BODY SUBJECT TO A VARIABLE EXTERNAL FORCE

Paul Deffrenne, Geneva, Switzerland, assignor to Mecanorga S.A., Geneva, Switzerland, a corporation of Switzerland
Filed Oct. 10, 1963, Ser. No. 315,334
Claims priority, application Switzerland, Oct. 26, 1962, 12,625
22 Claims. (Cl. 308—5)

This invention relates to improved means for controlling the movement of a body with respect to a reference body.

A device for the purpose of maintaining a constant distance between two bodies, one of which is movable in relation to the other, hereinafter called a "reference body" on which a variable external force acts has already been described in U.S. Patent No. 3,100,130. An essential feature of this device is a so-called "corrector" element having the double function firstly of regulating the pressure of a fluid which, circulating in one or several chambers arranged between the adjacent surfaces of the two bodies separated by a slight clearance, exerts on the movable body an antagonistic effort which counterbalances the external force and, secondly, of carrying out a compensating movement for each movement of the movable body, whereby said body is caused to return to a predetermined position.

A similar device may also be used to keep constant the distance between the extremity of a driving mechanism, considered as the reference body and a movable body displaced by the action of a servo-mechanism, this distance being always of the same predetermined magnitude and being independent of the external force acting on the movable body and of the stresses prevailing within the elements of the servo-mechanism. Such a device has been described in U.S. Patent No. 3,205,783.

The inventions disclosed in these specifications have been effective in carrying out the purposes for which they were designed. However, certain difficulties have been observed in carrying these inventions into effect, and it is an object of the present invention to obviate said difficulties.

It has been found in particular that, in order to attain a high degree of operational precision of the device, which is itself dependent on a high degree of precision in the position occupied by the corrector element in relation to the movable body, it was indispensable to free the said corrector element from all parasitic effects and to operate it always under the same conditions.

Moreover, the use of the same fluid for both controlling the position of the corrector element in relation to the movable body and with regard to the fixed body and to exert an antagonistic effect on the movable body constitutes a defect where the fluid concerned is a liquid. In this case, the control of the position of the corrector element is liable to be affected by the viscosity of the liquid, its temperature which varies during operation and the dilatations resulting therefrom. In addition, the diameters of the conduits are large, so that the overall dimensions become very great.

First, it was provided in Swiss Patent No. 363,201, which corresponds to U.S. Patent No. 3,100,130, to use systematically as essential parts of the device two elements, namely a corrector to control the position of the movable body and a distributor element to regulate the pressure of the antagonistic fluid; then, in order to ensure the operation of the corrector, to use the flow of a gas, preferably a sonic flow, this gas being in general air, while the antagonistic fluid can be selected as is best suitable for the particular application; finally to add to the above mentioned devices certain other improvements.

These drawbacks are voided by the present invention which has for its object an improved device for maintaining constant, in a predetermined direction, the distance between adjacent surfaces of a reference body and of a movable body, these bodies being separated by a slight clearance, wherein the movable body is subjected to a variable external force and to an antagonistic force exerted by pressurised fluids applied in one or several zones located opposite to each other limited by the movable body. The improved device is characterized in that it comprises a first element, hereinafter called a corrector element, which slides within the reference body in the manner of a slide valve and the distance of which to the movable body determines the pressure of a first gas circuit, called the primary circuit, which flows at a certain feed pressure through two orifices, one of which is constituted by a nozzle of diameter $O_1$, and the other by the surface $L_1 \times d_1$ of a cylinder whose base is the perimeter circumference $L_1$ forming the lips of a hole provided in the corrector element and whose height is the distance $d_1$ between the plane of said circumference and the surface of the movable body, a wall integral with the reference body determines the pressure of a second gas circuit, called the secondary circuit, which flows, at the same feed pressure, through two orifices of the same type as those previously described and placed in the same order, one of them being constituted by a nozzle of diameter $O_2$ and the other by the surface $L_2 \times d_2$ of a cylinder whose base is the perimeter circumference $L_2$ forming the lips of a hole provided either in the corrector element, or in a wall integral with the reference body, and whose height is the distance $d_2$ between the plane of the said circumference and the corresponding face of the other of the two parts, the wall integral with the reference body and the corrector element respectively, the arrangement of the device being such that the pressures $p_1$ and $p_2$ of the primary and secondary circuits act respectively on surfaces $s_1$ and $s_2$ of the corrector element, in such directions, that an initial displacement of the movable body brings about a displacement in the opposite directions of the corrector element. Furthermore, the various values of $O_1$, $L_1$, $O_2$ and $L_2$, of which the values of $p_1$ and $p_2$ depend, are chosen so that the product of $p_1$ by $s_1$ always equals the product of $p_2$ by $s_2$ whatever the feed pressure, the sole condition being that the distance between the corrector and the wall integral with the reference body should equal the distance between the corrector and the movable body, which compels the latter to remain in a predetermined position. A second element, called a distributor, regulates the pressure of at least one of the fluid circuits which supplies two opposite groups of pressure chambers or zones as a function of the position occupied by the corrector. Connecting elements are arranged at least between the distributor and the pressure zones and such that the fluid pressure varies in such a manner that the variation of the resulting stress has the tendency to oppose the variation of the external force. Thus the corrector cannot be in equilibrium unless the movable body occupies a predetermined position in relation to the reference body and each displacement of the movable body from said position, brought about by a variation of the external force, has the effect of disrupting the equilibrium of the pressures acting on the two faces of the corrector and cause this element to be displaced, which movement varies, through the intermediary of the distributor, the antagonistic action exerted by the fluid, so as to create a new state of equilibrium by causing the movable body to return to its predetermined position in relation to the reference body.

For example, the movable body may be a body of revolution rotating about its axis and the reference body a stationary body surrounding the movable body with a slight clearance. This is the case of a shaft rotating in its bearing or of a pivot.

The movable body may have the form of a cylinder and may slide parallel to its generatrices in the reference body which is stationary and which has the same cross-section, increased by a slight clearance. This is the case of a carriage sliding in guide rails.

The movable body may be a servo-driven element, compelled to follow with great exactitude the movements of a control mechanism which, in this particular case, constitutes the reference body. This is the case of a carriage the displacement of which is servo-controlled by the movement of a control mechanism.

The invention will now be described with reference to the accompanying drawings which illustrate schematically and by way of example various embodiments of the invention, and in which.

Figure 1:
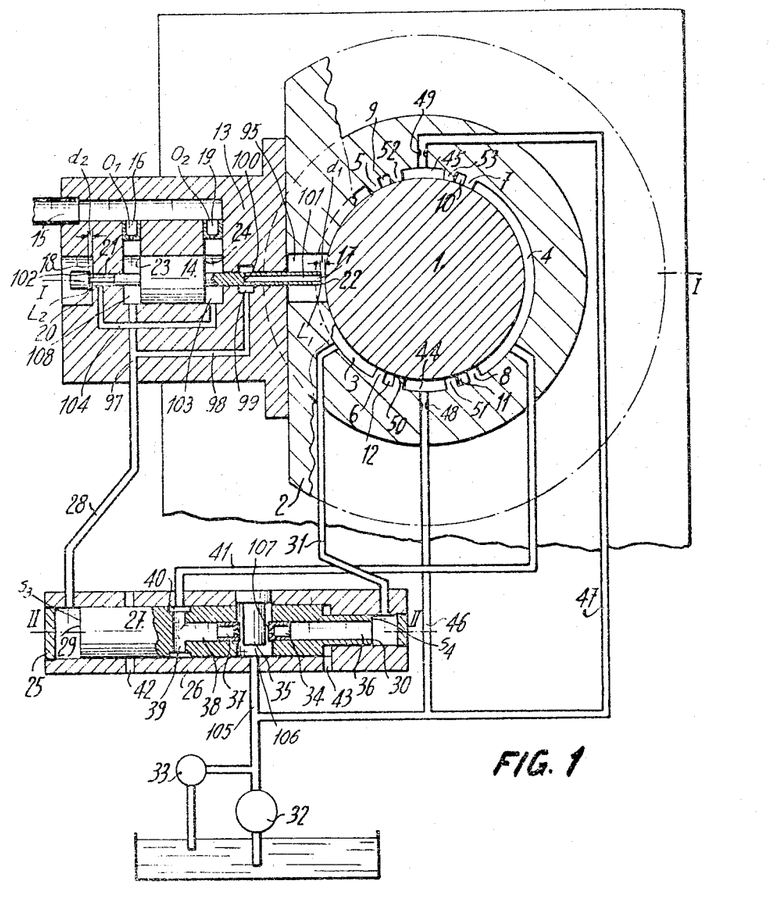
FIGURE 1 shows the application of the invention to a shafta rotating in its bearing (or of a carriage sliding in a round guide) and illustrates a transverse section of such an arrangement, the effect of which is limited to a single plane and which comprises two opposing groups of chambers or zones of variable fluid pressure, the pressure increasing in one zone while diminishing in the other zone and inversely.
Figure 2:
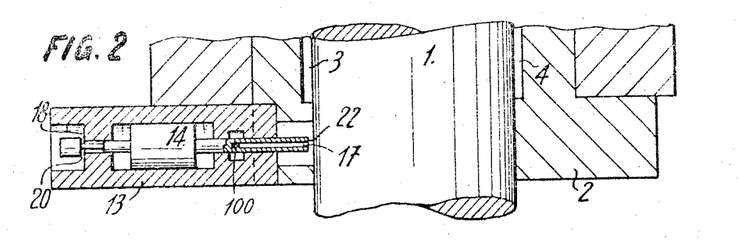
FIGURE 2 shows a horizontal section thereof on the line I—I of FIG. 1.
Figure 3:
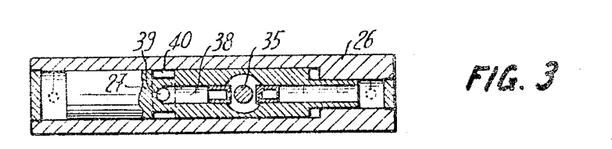
FIGURE 3 shows a horizontal section on the line II—II of FIG. 1.

In the arrangement illustrated in FIGS. 1, 2 and 3, a shaft 1, constituting the movable body, rotates about its axis in a bearing 2, which forms the reference body. It should be noted that the following explanations also apply to the case where the shaft 1, instead of rotating about its axis, slides parallel to the later, which is similar to a carriage sliding on slide rails.

A slight clearance exists between the shaft 1 and the bearing 2. Two groups of pressure zones, constituted by chambers 3 and 4, are provided on the internal surface of the bearing 2, in diametrically opposite regions, each of these chambers being in communication with a variable-pressure fluid. After traversing chambers 3 and 4 respectively, the fluid escapes through the clearance existing between the shaft 1 and projecting portions 5, 6, 7, 8 of the bearing 2, towards discharge grooves 9, 10, 11 and 12 which communicate with the outside. When the fluid used is a liquid, the return to the tank is ensured by a regenerating system, not shown.

The variable external force is assumed to act on the shaft in a direction parallel to the diametrical line linking the centres of chambers 3 and 4.

On the generatrix of the bearing 2 passing through the center of one of the two chambers 3 or 4, preferably as near as possible to the part of the shaft 1 where the external force acts, but in any case outside the chambers 3 or 4, there is provided a recess 95 permitting the end of a control element, the so-called corrector 14, to penetrate to the immediate vicinity of the shaft 1. This corrector 14 slides in the bore of a housing 13 integral with the bearing 2 in the manner of a slide valve.

On the one hand, the position of the corrector 14 with regard to the shaft 1 regulates the intermediate pressure $p_1$ of a first gas circuit arriving from a pressure source P, the so-called primary circuit, through two orifices: the orifice arranged upstream is a nozzle 16 of the fixed dimension $O_1$ and causes a pressure drop of the gas from the value P to the value $p_1$; the orifice arranged downstream, with a variable cross section, consists of the surface $L_1 \times d_1$ of a cylinder whose base is the circumference 17 of the perimeter $L_1$, representing the intersection of a bore $10_1$ and of the face 22 of the corrector 14, and whose height is the distance $d_1$ between the face 22 of the corrector 14 and the surface of the shaft 1, and causes a pressure drop of the gas from the value $p_1$ to that of the atmospheric pressure existing in the recess 95. The gas arriving from the pressure source P flows into the corrector through the channel 15. After having traversed the nozzle 16, the enclosure 108, the channels 97, 97 and the throat 99, it penetrates through the hole 100 into a bore 101 provided axially in the slide valve 14, at the end of which is arranged the circumference 17 mentioned above.

On the other hand, the position of the corrector 14 with regard to a reference wall 18 of the housing 13 integral with the bearing 2, regulates the intermediate pressure $p_2$ of a second gas circuit originating from the same pressure source P as above, the so-called secondary circuit, through two orifices: the orifice arranged upstream is a nozzle 19 of the fixed dimension $O_2$ and causes a pressure drop of the gas from the value P to the value $p_2$; the orifice arranged downstream, and having a variable cross section, consists of the surface $L_2 \times d_2$ of a cylinder whose base is the circumference 102 of the perimeter $L_2$, representing the intersection of a bore 21 and of the wall 18 of the housing 13 and the face 20 of the corrector 14 (or whose base is the circumference of a second hole provided in the corrector and whose height is the distance of the plane of this hole from a face of the housing 13 integral with the bearing 2), and causes a pressure drop of the gas from the value $p_2$ to atmospheric pressure. The gas arriving from the same pressure source P as above, through the same channel 15, traverses the nozzle 19, the chamber 103, then through the channel 104 penetrates into a bore 21, at the end of which is arranged the circumference 102 mentioned above.

The apertures 17 and 21 having perimeters $L_1$ and $L_2$ are preferably circular, but may have any other form.

The face 22 of the corrector 14, the distance of which from the shaft 1 determines the value of the primary pressure $p_1$, may, by reason of the small dimensions of aperture 17, be a plane face and does not require to conform to the contour of the shaft 1.

The respective faces 20 and 22 of the corrector 14, with which are associated the distances $d_1$ and $d_2$, are in general perpendicular to the axis of sliding movement of the corrector 14, although in fact they may also be inclined in relation to the axis.

The primary pressure $p_1$ is exerted on a surface $s_1$ of the corrector 14, the major portion of which is constituted by a face 23 of the corrector 14, having a diameter sufficient to ensure the desired sensitiveness. This primary pressure tends to urge the corrector 14 towards the shaft 1.

The secondary pressure $p_2$ acts in a direction opposite to that of $p_1$ on a surface $s_2$ of the corrector 14, the principal portion of this surface being constituted by the face 24. This secondary pressure tends to separate the corrector 14 from the shaft 1.

It is obvious, that the equilibrium of the corrector 14 cannot be achieved unless $p_1 \times s_1 = p_2 \times s_2$. In these conditions, the values of $O_1$, $L_1$, $O_2$ and $L_2$ are chosen so that the pressures $p_1$ and $p_2$ always remain within the inverse ratio of the surfaces $s_1$ and $s_2$ respectively on which they are exerted and this whatever the magnitude of the pressure P, under the sole condition that the distance $d_2$ between face 20 of the corrector 14 and the reference wall 18 integral with the bearing 2 be equal to the distance $d_1$ between the face 22 of the corrector 14 and the shaft 1, which compels the latter to remain in a predetermined position.

The gas flow in the primary and secondary circuits is, most of the time, a sonic flow, by reason of the greater precision inherent to this system of measuring.

In this case, calculations show that the relation linking $O_1$, $L_1$, $O_2$ and $L_2$ is:

$$\frac{O^1}{L^1} = k \frac{O_2}{L_2}, \text{ where } k = \frac{s_2}{s_1}$$

If, on the contrary, the flow of the gas is a subsonic one in the upstream nozzles, the necessary condition is: $k=1$, that is, the pressures $p_1$ and $p_2$ and, consequently, the surfaces $s_1$ and $s_2$ must be equal;

$$\frac{c_1 O_1}{L_1} = \frac{c_2 O_2}{L_2}$$

where $c_1$ and $c_2$ are coefficients depending on the characteristics of the upstream nozzles; similarly, the laws governing the output of the two upstream nozzles of the upstream and downstream pressures must be the same, since $c_1$ and $c_2$ can vary in the ratio of these pressures.

If, lastly, the gas flow is subsonic in the downstream orifices, conditions similar to the preceding must be imposed on said orifices.

When the aforestated conditions are satisfied, the corrector 14 cannot be at equilibrium unless the shaft 1 occupies a predetermined position in relation to the bearing 2.

If, on the other hand, the corrector 14 being in equilibrium, the shaft 1 is displaced, for example by moving away from the adjacent surface of the bearing 2, the cross-section of the downstream orifice of the primary circuit increases and, consequently, the primary pressure $p_1$ diminishes while the secondary pressure $p_2$ has not yet changed. FIGURE 1 shows that, owing to the unbalance of pressures $p_1$ and $p_2$, the corrector 14 moves away from the axis of bearing 2. If, on the other hand, the shaft 1 approaches the wall of the bearing 2 next to the corrector 14, the latter approaches the axis of the bearing 2. Thus, a movement of shaft 1 in a given direction causes the corrector 14 to move in the opposite direction.

Experiments carried out have also brought to light the importance of certain factors and have contributed to improving the initial invention above referred to.

To ensure the stability of the device, it is necessary that the volume of gas comprised between the two discharge orifices of the primary circuit be greater than the corresponding volume of the secondary circuit. Thus, when the whole of the system is in equilibrium and when the corrector 14 tends to move owing to an accessory cause, for example, in approaching the axis of the bearing 2, its displacement provokes, firstly, an increase of the secondary pressure $p_2$ which responds more rapidly by reason of the smaller volume of the secondary circuit, an increase which tends to move the corrector 14 away from the axis of bearing 2 and to return it to its initial position.

If, on the contrary, the volume of the gas in the primary circuit were smaller than that of the gas in the secondary circuit, the effects would be inverted and the equilibrium of corrector 14 would become unstable.

The second essential element of the device, called a distributor, 25 varies the pressure of the antagonistic fluid as a function of the primary pressure $p_1$, and is constituted by a cylinder 26, in which slides a slide valve 27 having two levels which communicate with the primary circuit by means of a conduit 28.

The pressure $p_1$ of the control gas in the primary circuit acts on one of the faces 29 of slide valve 27, said face having an area $s_3$.

On the opposite face 30, having an area $s_4$ the pressure of the antagonistic fluid acts which, through a conduit 31, supplies a pressure chamber 3 located in the bearing 2, on the same side as the corrector 14.

The ratio $s_3/s_4$ of the surface depends, on one hand, on the magnitude of the external force to be compensated and on the structural characteristics of the bearing 2 and, on the limits of variation of the primary operational pressure $p_1$ of the control gas.

The movement of the slide valve 27, under the effect of the pressure variations to which it is exposed, causes a variation in the dimension of an inlet orifice of a first fluid flow circuit, fed by a pressure source, for example a pump 32 provided with a by-pass 33, a channel 105 and a chamber 106. This inlet orifice is constituted by the surface of a cylinder whose base is the circumference forming the lips of a hole 107 provided in the cover 34 mounted on the slide valve 27 and whose height is the distance between the plane of the said circumference and the surface of a stationary element 35 integral with the cylinder 26 arranged so as to ensure that the increase of pressure $p_1$ causes an increase in the diameter of the passage. The fluid is fed through conduits 36 and 31 into the chamber 3, from where it escapes towards the grooves 9 and 12 through the clearance existing between the shaft 1 and the projecting portions 5 and 6 of the bearing 2.

A second fluid circuit, connected to the same pressure source, acts in a reverse order. Its inlet orifice diminishes when the pressure $p_1$ increases and inversely. To this end, its cap element 37, integral with the slide valve 27, is located on the other side of the stationary element 35 integral with the cylinder 26. Through the conduits 38 and 39, the groove 40 and the conduit 41, the fluid is led to the chamber 4, located on the internal face of the bearing 2 opposite to the corrector 14, from where it escapes towards the grooves 10 and 11 through the clearance existing between the shaft 1 and the projecting portions 7 and 8 of the bearing 2.

In the event that owing to the very small magnitude of this clearance, the corresponding dimensions of the cap orifices are too small, an additional discharge means can be provided in each of the circuits, in order to be able to use cap elements with greater apertures.

Perturbations in the action of the pressures on the faces 29 and 30 of the slide valve 27 are avoided owing to the presence of conduits 42 and 43 which constitute communications with the exterior.

The system as a whole operates in the following manner:

Initially, when no external force is acting on the shaft 1, the whole of the system is in equilibrium; the slide valve 27 of the distributor 25 is in an intermediate position such, that the stresses resulting from the action of the pressures of the antagonistic fluid in the two opposite chambers 3 and 4 balance each other; the primary pressure $p_1$ of the control gas is a function of the pressure of the antagonistic fluid feeding the chamber 3, since the slide valve 27 of the distributor 25 is in equilibrium. Lastly, the corrector 14 being itself in equilibrium, in a median position, the shaft 1 occupies its predetermined operating position.

When an external force acts on the shaft 1 in a certain direction, the shaft 1 at first tends to move in the direction of that force. For example, assume that the shaft tends to move in the direction of the wall of bearing 2 adjacent to the corrector 14. The primary pressure $p_1$ of the control gas increases, since the outlet cross-section of the primary circuit, $L_1 \times d_1$, diminishes. The corrector then effects a compensating movement towards the axis of the bearing 2, which intensifies the increase of pressure $p_1$. The slide valve 27 of the distributor 25, under the effect of the unbalance of the pressures to which it is now subjected, moves towards the right-hand side of the drawing, in such a manner, that the pressure of the fluid in chamber 3 which is located on the same side as the corrector 14, increases at the same time as the pressure $p_1$. Simultaneously, the fluid pressure diminishes in the second circuit which acts in the chamber 4 located opposite chamber 3.

Under the combined effect of the variation of the fluid pressure in the two opposite chambers 3 and 4, the compensating force acting on the shaft 1 finally exceeds the value of the external force and urges the shaft back towards its initial position. A new equilibrium is established after some slight oscillations when the shaft 1 returns to this position, the slide valve 27 of the distributor 25 having taken up a new position such that the difference of the stresses exerted by the fluids of chambers 3 and 4 compensates the external force and the corrector 14 itself being in a position of equilibrium such that the primary pressure of the control gas $p_1$ ensures the equilibrium of the slide valve 27.

The same considerations apply when the shaft 1 moves in the opposite direction.

In the arrangement illustrated in FIGS. 1, 2 and 3, the distributor 25 is actuated by the primary pressure $p_1$. In other forms of embodiment, this function may be exercised by the secondary pressure $p_2$.

Similarly, the distributor 25 regulates the upstream orifice of the circuits of the antagonistic fluid. With certain modifications, in particular by inverting the chambers 3 and 4 operated by the two circuits, the downstream orifice of the circuits of the antagonistic fluid can be regulated.

Furthermore, in the example hereinbefore described, the gaseous control fluid coming from a common pressure source P passes into each of the primary and secondary flow circuits, firstly into a nozzle of constant cross-section (respectively $O_1$ and $O_2$) and thereafter into the orifice of variable cross-section (respectively, $L_1 \times d_1$ and $L_2 \times d_2$). It is obvious, that an arrangement of the type described in great detail in the British Patent No. 917,117 which provides a reverse order of these two types of orifices, can be employed without difficulty.

In this case, it is sufficient that the primary and secondary pressures act on the corrector 14, as previously described, in such a direction, that each movement of the shaft 1 brings about a movement of the corrector 14 in the opposite direction and, that the connections be constructed in such a fashion that the pressure of the antagonistic fluid varies in a manner whereby the variation of the stress resulting therefrom tends to oppose the variation of the external force.

In the direction perpendicular to the direction of the external force, the shaft 1 is maintained in an intermediate position, avoiding contact with the walls of the bearing 2, owing to the forces exerted in two opposite chambers 44 and 45 by fluids the pressure of which is controlled by a flow between two orifices, the upstream orifice, supplied by the pump 32 and the conduit 46, 47 being constituted by a nozzle, 48 and 49 respectively, and the downstream orifice being constituted by the clearance between the shaft 1 and the projecting portions 50, 51 and 52, 53 of the bearing 2.

The slight irregularities in the position of the shaft 1 in the direction perpendicular to the direction of the external force are without importance with regard to the efficiency of the device as hereinbefore described.

Figure 4:
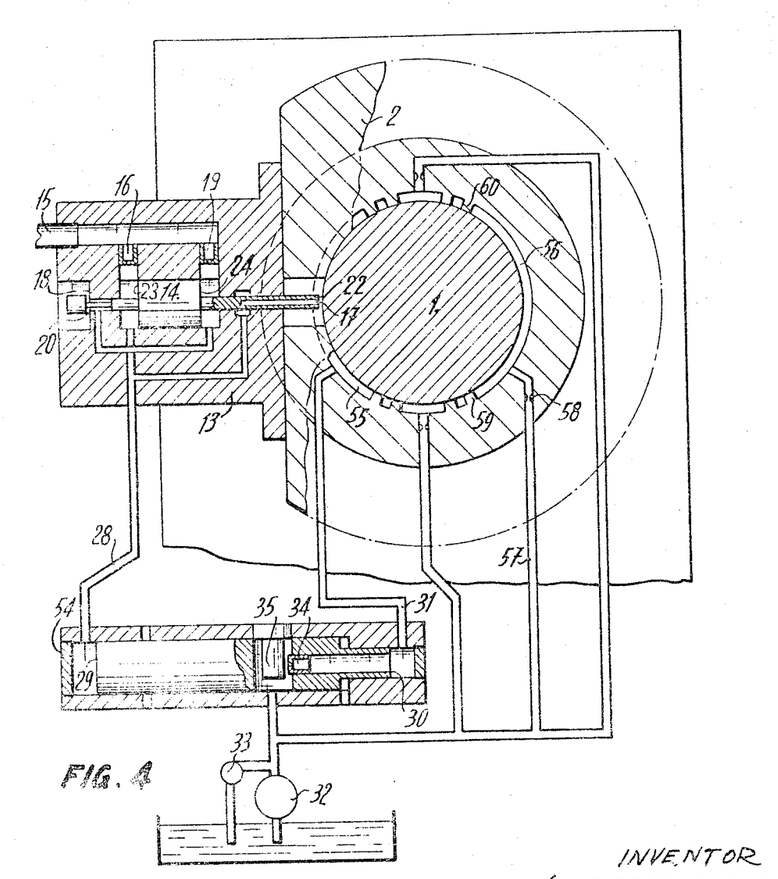
FIGURE 4 shows a simplified form of the device illustrated in FIG. 1, having a single group of fluid pressure variation chambers or zones, the pressure of the fluid in the opposing group being constant.

In FIGURE 4 which illustrates a simplified embodiment the distributor 54 has a single cap element 34, controlling only one control circuit of the antagonistic fluid, namely the one which feeds chamber 55 located on the same side as the corrector 14 through channel 31.

The opposite chamber 56 is fed by a fluid under constant pressure such that the action exerted on the shaft 1 by the antagonistic fluid of this chamber 56 is within the limits of variation of the force exerted by the variable-pressure fluid feeding the other chamber 55.

The constant pressure of the chamber 56 is regulated by the flow of the fluid coming from the pump 32 and the conduit 57 between two orifices, the upstream orifice being constituted by a nozzle 58 and the downstream orifice being constituted by the clearance between the shaft 1 and the projecting portions 59 and 60 of the bearing 2.

In the case where the external force always acts in the same direction on the shaft 1, as in the case of a machine tool, the dimensions of the constant-pressure chamber 56 and its pressure may be small and, in extreme cases, this element may be dispensed with altogether.

Figure 5:
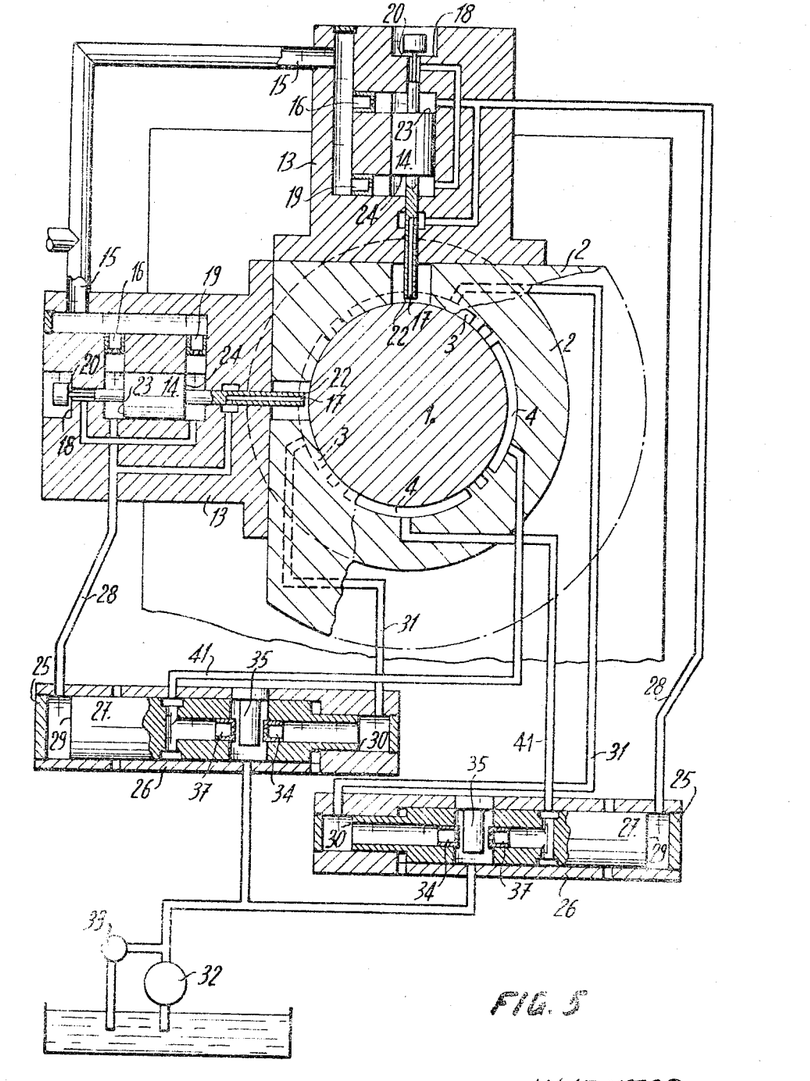
FIGURE 5 illustrates an embodiment analogous to that of the FIG. 1, but acting in two orthogonal planes.

FIGURE 5 relates to the application of the device illustrated in FIGS. 1–3 to the case where the external force may have any direction.

Two assemblies, corrector 14 and distributor 25, the function of which is identical to those described in FIGS. 1–3, act in orthogonal planes and maintain the shaft 1 in a predetermined position, whatever the intensity of the component of the external force acting in the direction of the two correctors 14.

Figure 6:
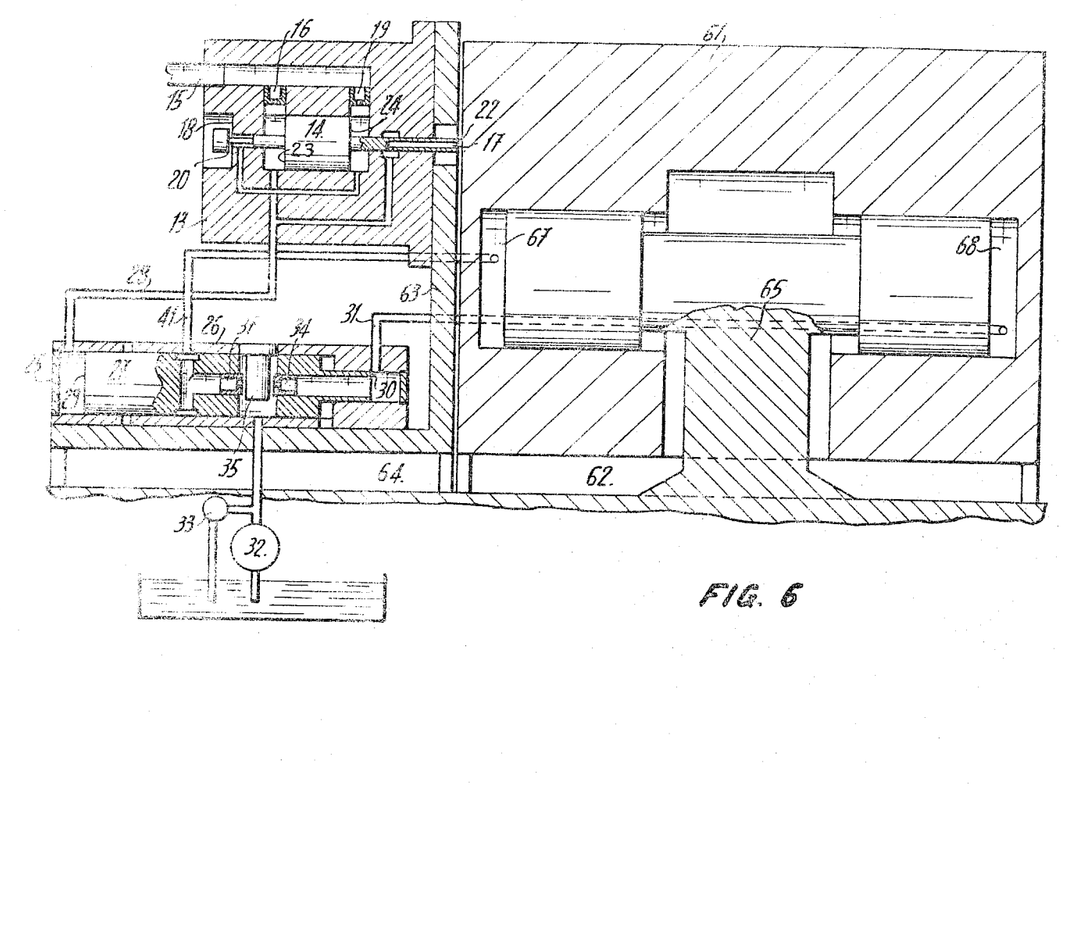
FIGURE 6 shows the invention applied to a servo-control of a carriage, the drive mechanism of which has been freed of any variable external force and which comprises two opposing groups of variable fluid pressure chambers or zones, the pressure increasing in one zone while diminishing in the other and inversely.

FIGURE 6 illustrates an embodiment in which the movable body is a servo-controlled carriage 61 of a machine, sliding on slide rails 62 and subjected to a variable external force. The reference body is the drive mechanism 63, actuated by any suitable system, for example manually or automatically, which is not subjected to any external variable force and which slides on slide rails 64 parallel to the slide rails 62 of the carriage 61, each of these two bodies 61 and 63 being displaceable in relation to a fixed body which, in this particular case, is the frame 65 of the machine, the slide rails 62 and 64 forming integral parts thereof.

A corrector 14 with housing 13 and a distributor 25 have the same elements and fulfill the same functions as those described with reference to FIGS. 1–3 and are mounted on the drive mechanism 63. Variable-volume chambers 67 and 68 are provided between the carriage 61 and the frame 65. The antagonistic fluid, controlled by means of the distributor 25 from the corrector 14, acts in the opposite direction in these chambers 67, 68 in the manner of the fluid acting in the chambers 3 and 4 of the bearing according to FIG. 1.

In this case, the system functions in the following manner:

When the drive mechanism is displaced, for example towards the left-hand side of the figure, the primary pressure of the control gas $p_1$ tends to decrease. The distributor 25 acts immediately and the pressure of the antagonistic fluid feeding the chamber 67, arranged between the left side of the frame 65 and the carriage 61, increases, while the pressure of the antagonistic fluid feeding the chamber 68, located between the right-hand side of the housing 65 and the carriage 61, diminishes. The carriage 61, which was hitherto in equilibrium under the effect of the external force and the antagonistic effect of the fluids filling the two chambers 67 and 68, will move in the same direction as the drive mechanism 63 and this up to the instant where it reoccupies in relation to the drive mechanism, the predetermined position which it has previously occupied.

This position is independent of the magnitude of the external force, in spite of the stresses which prevail in the elements of the servo-control.

Figure 7:
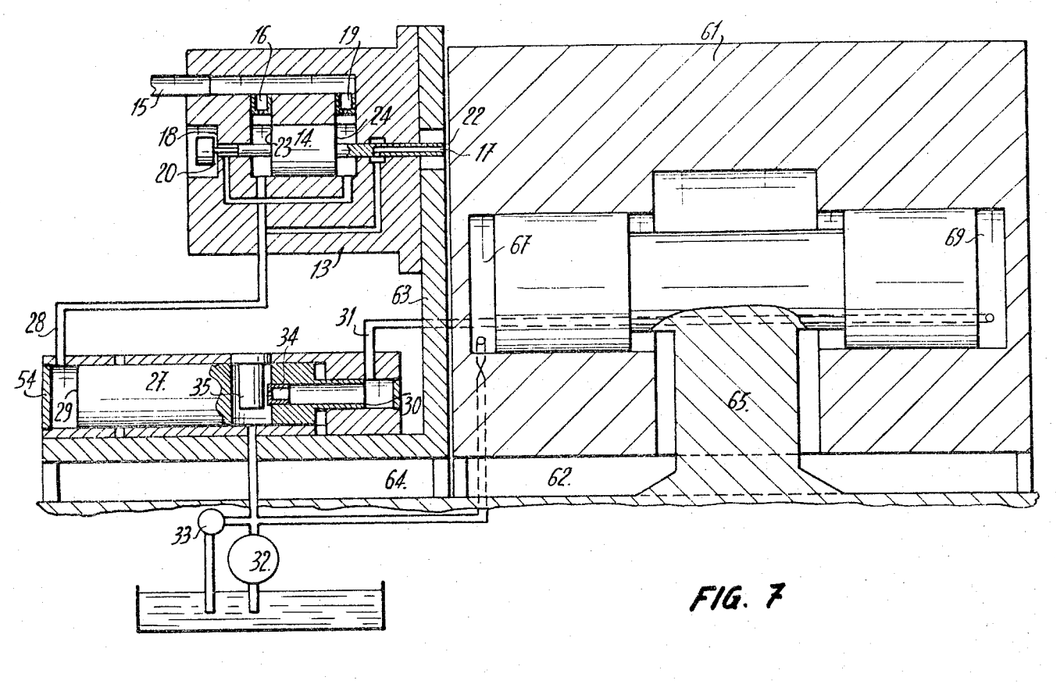
FIGURE 7 shows a simplified form of the device illustrated in FIG. 6, with only one group of variable fluid pressure zones, the pressure of the fluid in the opposite group being constant.

FIGURE 7 illustrates a simplified embodiment of the arrangement shown in FIG. 6. As in the case of FIG. 4, chamber 67, instead of being supplied through a distributor 25, is fed, in this case as well, by a constant-pressure fluid. In this case, the distributor 25 is replaced by the simplified distributor 54 having a single cap element 34, as in the case illustrated in FIG. 4.

Figures 8, 9, 10:
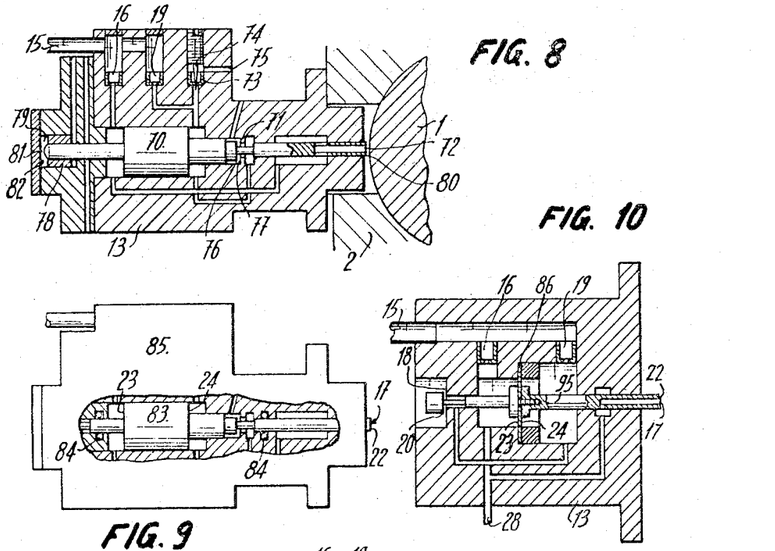
FIGURE 8 illustrates one form of the corrector element.
FIGURE 9 illustrates an embodiment of the corrector in which the movement thereof is effected by a ball bearing.
FIGURE 10 illustrates an embodiment of the corrector in which gas pressures act on a deformable membrane.

FIGURE 8 shows an embodiment of the corrector 14, designated here as a whole by 70.

For the sake of easy machining, the primary and secondary gas circuits are arranged in such a manner, that the corrector 70 as a whole can be formed in a single piece, which was not the case in the previous examples. Furthermore the aperture 71, the perimeter of which regulates the secondary flow, has a diameter greater than that of 72, the perimeter of which regulates the primary flow.

FIGURE 8 also shows certain modified arrangements.

In practice, the value of the pressures $p_1$ and $p_2$ is slightly affected by outward leaks through clearances in various regions of the corrector 70. However, these leakages have no appreciable influence owing to their negligible value in relation to the flow through the principal orifices.

However, an adjustable outward leakage is provided in one of the circuits, for example the secondary circuit. This leakage takes place through a calibrated orifice 73, into which a conical rod 74 extends to a greater or lesser extent, so that the gas of the secondary circuit can escape outwards through the annular orifice thus created and the conduit 75.

The purpose of this adjustable leak is to compensate and to equalise the outward leakages of the two circuits and to cause the predetermined position of the shaft 1 to coincide with its optimum position in relation to the bearing 2, for example in its geometric centre.

The distance $d_1$ between the surface of the shaft 1 and the perimeter of the aperture 72, which determines the operational position of the shaft 1 must, in this case, equal a fictitious value $d_2$, which is itself equal to the distance between the face 76 of the corrector and the wall integral with the bearing 2, corrected as a function of the magnitude of the adjustable leakage, which gives $d_1$ the desired value by the adjustment of this leakage.

Vibrations of the corrector are prevented by means of a dash-pot, constituted by a piston 78 rigidly connected with the corrector 70 and sliding with a certain clearance in a fixed cylinder 79 filled with a liquid.

Moreover, when the face 76 of the corrector 70 abuts on its support 77, the extremity 80 of the corrector located adjacent to the shaft 1 is slightly set back in relation to the wall of the bearing 2. A false movement cannot therefore cause a friction between the extremity 80 of the corrector 70 and the rotating shaft 1, which would otherwise cause the extremity 80 to be worn down and cause irregularities in the system.

The extremity 81 of the corrector in the dash-pot, by meeting the cover 82, limits the course of the corrector 70 when the latter deviates from the axis of the bearing 2.

As shown in FIGURE 9, a modified form of the corrector designated as a whole by 83, rolls on balls 84 arranged between the housing 85 and the corrector, instead of sliding on its guides. The sliding portions of the corrector move in the bores of the housing 85 without touching the latter but nevertheless providing a sufficiently tight closure to prevent the gas from escaping.

In view of the very brief travel of the corrector 83, of the order of some hundredths of a millimeter, the movement of the balls 84 is extremely small.

In the modified form of embodiment of the corrector illustrated in FIGURE 10, the control gas pressures $p_1$ and $p_2$ of the primary and secondary circuits respectively act not on the faces of a piston but on the faces of a deformable membrane 86, integral in its central portion with the corrector 95. The other elements of the corrector are designated by the same reference numbers as in FIG. 1.

Figure 11:
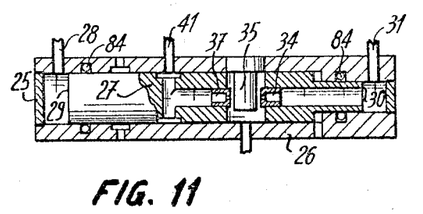
FIGURE 11 shows one form of distributor, the movement of which is effected by means of a ball bearing.
Figure 12:
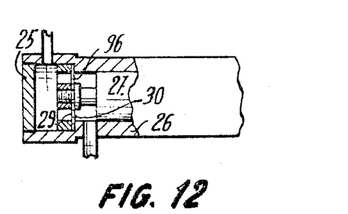
FIGURE 12 illustrates an embodiment of the distributor, in which the pressure of a control gas and the pressure of a fluid act on a deformable membrane.

FIGURES 11 and 12, respectively, illustrate improvements applied to the distributor which are similar to improvements indicated for the corrector in FIGS. 9 and 10, namely the arrangement of balls 84 between the cylinder 26 of the distributor and its slide valve (FIG. 9) and the arrangement of a membrane 96 between the body 26 of the distributor 25 and its slide valve 27. The opposing faces of this membrane 96 constitute, at least partly, the faces 29 and 30 of the distributor according to FIG. 1.

Figure 13:
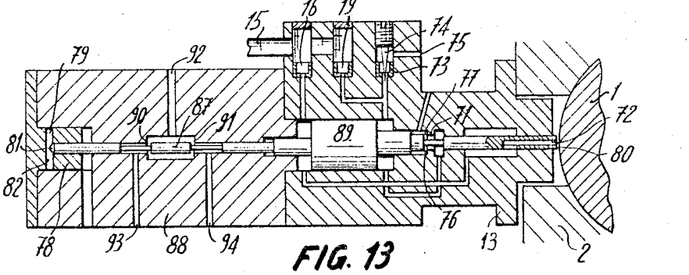
FIGURE 13 illustrates an embodiment of the invention in which the distributor, instead of forming a separate element, is constituted by a slide valve integral with the corrector.

FIGURE 13 illustrates an embodiment, in which the slide valve 87 of the distributor 88, instead of being driven by the variations of the primary pressure $p_1$ or by those of the secondary pressure $p_2$, is integral with the corrector and moves at the same time as the latter. This corrector 89 comprises the same elements as those of the corrector 70 illustrated in FIG. 8, including the dash-pot 78, 79.

Two sets of edges 90 and 91 serve to vary, for each circuit, the cross-section of the inlet orifices, thus controlling the pressure of the fluid coming from the pump 32 through the conduit 92 and feeding the two opposing chambers, through the conduits 93 and 94, varying the pressure in the same manner as in the previously described arrangements.

As already indicated for the embodiment of FIGS. 1–3, the arrangements described in the subsequent forms, FIGS. 4–13, apply equally to the case where the sequence of the passage of the control gas in the two orifices of each circuit, respectively $O_1$ and $O_2$ of constant cross-section and $L_1 \times d_1$ and $L_2 \times d_2$ of variable cross-section is reversed, the gas then passing first through the orifice with variable cross-section and thereafter in the orifice with constant cross-section.

I claim.

1. A device for maintaining constant in a determined direction the distance between adjacent and lightly spaced surface of a reference body (2) and of a movable body (1), said movable body being subjected to an outer variable force and to an antagonistic force exerted in at least two pressure zones (3, 4) located opposite each other, fluid circuits under pressure controlling said pressure zones, said device comprising a corrector element (14) slidable in the reference body (2) in the manner of a slide valve, the distance of which to the movable body (1) determining the pressure in a primary gas circuit in which a flow of gas, at a certain feed pressure, takes place through two orifices, one of said orifices consisting of a nozzle (16) with the cross section $O_1$ and the other being composed of the surface ($L_1 \times d_1$) of a cylinder whose base is the perimeter circumference ($L_1$) forming the lips of an opening (17) provided in the corrector element (14) and whose height is the distance ($d_1$) between the plane of the said circumference and the surface of the movable body (1), the distance from a wall integral with the reference body (2) determining the pressure in a secondary gas circuit in which a flow of gas, at the same feed pressure, takes place through two secondary orifices of the same nature as those of the primary circuit and placed in the same order, one of said secondary orifices consisting of a nozzle (19) with the cross section $O_2$ and the other being composed of the surface $L_2 \times d_2$ of a cylinder whose base is the perimeter circumference $L_2$ forming the lips of an opening (21) which is part of the reference body and communicates with said corrector element (14), the height of said other secondary orifice being the distance $d_2$ between the plane of the said circumference and the corresponding face of the adjacent corrector (14), the assembly being so arranged that the pressures $p_1$ and $p_2$ of the primary and secondary gas circuits act respectively on the surfaces $s_1$ (23) and $s_2$ (24) of the corrector (14) in such directions that an elementary displacement of the movable body (1) causes a displacement in the opposite direction of the corrector (14), the various values $O_1$, $L_1$ $O_2$ and $L_2$, on which the values of $p_1$ and $p_2$ depend, being determined in such a way that the product of $p_1$ by $s_1$ is always equal to the product of $p_2$ by $s_2$, whatever the feed pressure, provided only that the distance $d_2$ of the corrector (14) from the wall integral with the reference body (2) is equal to the distance $d_1$ of the corrector (14) from the movable body (1) which forces the latter to remain in a predetermined position, a distributor (25) adapted to regulate the pressure in at least one of the fluid circuits which feed the two opposite pressure zones (3, 4) as a function of the position occupied by the corrector (14) so that the pressure of the fluid in said zones varies in such a direction that the variation of the force acting on the movable body has a tendency to oppose the variation of the outer force, so that the corrector (14) can only find its equilibrium when the movable body (1) occupies the said predetermined position with regard to the reference body (2) and that any displacement of the movable body (1) from the said position, caused by the variation of the outer force, has the effect of disturbing the equilibrium of the pressures acting on the two faces of the corrector (14) and of producing a displacement of said corrector (14), which in turn results in the antagonistic force exerted by the fluid by means of the distributor to be varied and create a new state of equilibrium by bringing the movable body (1) to its predetermined position with regard to the reference body (2).

2. A device according to claim 1, wherein the flow of the gas is sonic at least in the orifices with the variable cross section $L_1 \times d_1$, $L_2 \times d_2$ of the primary and secondary circuit.

3. A device according to claim 1, wherein one (56) of the two pressure zones (55, 56 FIG. 4) is fed by a fluid circuit with constant pressure, the distributor (54) comprising only a regulating device (34, 35) for the pressure of the fluid circuit feeding the other zone.

4. A device according to claim 1, wherein said corrector element (14, FIG. 1) and the pressure zones (3, 4) are arranged to ensure a predetermined position of the movable body (1) with regard to the reference body (2) along a certain axis, and said corrector (14) providing a regulated flow of fluid due to the movement existing between said two bodies (1, 2) to ensure the support of the movable body (1) along a perpendicular axis.

5. A device according to the claim 1, including two correctors (14, FIG. 5) controlling two pairs of pressure zones (4, 3), said two correctors (14) and their pressure zones (4, 3) being arranged in orthogonal planes to ensure the positioning of the movable body in all directions.

6. A device according to claim 1, wherein the corrector 83, FIG. 9) is guided by rolling elements (84).

7. A device according to claim 1, wherein the surfaces $s_1$ (23), $s_2$ (24) of the corrector (95, FIG. 10) on which act the pressures of the gas of the primary and secondary circuit, $p_1$ and $p_2$ respectively, consist at least partly of the opposite faces of a deformable diaphragm (86) integral with the corrector (95).

8. A device according to claim 1 for maintaining a movable body whose surface is curved, wherein the face (22, FIG. 1) of the corrector (14) in which the opening (17) is provided and whose perimeter $L_1$ is a factor in the determination of the primary pressure $p_1$, is a planar cross section of the corrector (14) which, because of the small dimensions of the opening (17), coincides very closely with a curved face following the curved form of the movable body (1).

9. A device according to claim 1, wherein the openings (17 and 21) whose perimeters $L_1$ and $L_2$ are a factor in the determination of the primary and secondary pressure, $p_1$ and $p_2$ respectively, are round holes, in planes perpendicular to the axis of the corrector (14).

10. A device according to claim 1, wherein the outline of the opening (21), whose perimeter is a factor in the determination of the secondary pressure $p_2$, surrounds that of the opening (17) whose perimeter $L_1$ is a factor in the determination of the primary pressure $p_1$, with a sufficient margin to permit a corrector (14) to be formed of a single part.

11. A device according to claim 1, wherein the flow of gas in the nozzles of the primary and secondary circuits having a constant cross section ($O_1$ and $O_2$) is sonic.

12. A device according to claim 1, wherein in order to ensure the stability of the corrector (14), the volume of the enclosure in which the primary pressure $p_1$, prevails is greater than the volume of the enclosure in which the secondary pressure $p_2$ prevails.

13. A device according to claim 1, including a dash-pot (78, 79, FIG. 8) to damp the vibrations which may be produced on the corrector.

14. A device according to claim 1, wherein an adjustable gas escape opening (75, FIG. 8) is provided in at least one of the two primary and secondary circuits in order to facilitate control of the device and the positioning of the movable body (1) a predetermined distance from the reference body (2).

15. A device according to claim 1, wherein stop means (76, 77, FIG. 8) is provided to prevent the extreme end (8) of the corrector (70) located adjacent the movable body (1) from passing beyond the corresponding wall of the reference body (2).

16. A device according to claim 1, wherein stop means (81, 82, FIG. 8) is provided to limit the stroke of the corrector (70) when it moves away from the movable body (1).

17. A device according to claim 1, wherein the movable elements of the distributor (25, FIG. 11) are guided in the distributor body (26) by roller elements (84).

18. A device according to claim 1, wherein the pressure in the pressure zones (3, 4) is regulated in the distributor (25) as a function of the pressure $p_1$ of the gas in the primary circuit.

19. A device according to claim 1, wherein the pressure of the fluid in the pressure zones (3, 4) is regulated in the distributor (25) as a function of the pressure $p_2$ of the gas in the secondary circuit.

20. A device according to claim 1, wherein the movable elements of the distributor (25, FIG. 12) are connected with the distributor body (26) by at least one deformable diaphragm (96) the faces of which are acted upon by the pressure of the control gas which controls the position of the distributor, and the pressure of the fluid feeding one of the two pressure zones (3, 4).

21. A device according to claim 1, wherein the movable element 87, FIG. 13) of the distributor (88) consists of a slide valve integral with the corrector (89).

22. A device according to claim 1, wherein an adjustable gas escape opening (75, FIG. 13) is provided in at least one of the two fluid circuits feeding the pressure zones (3, 4) in order to avoid having to use flow passages of very small cross section in the distributor (88).

References Cited by the Examiner

UNITED STATES PATENTS

| | | | |
|---|---|---|---|
| 2,879,113 | 3/1959 | De Hart | 308—122 |
| 3,032,142 | 5/1962 | Axer | 184—5 |
| 3,039,483 | 6/1962 | Deering. | |
| 3,053,589 | 9/1962 | Cameron | 308—122 |
| 3,096,690 | 7/1963 | Haynes | 137—85 X |
| 3,126,233 | 3/1964 | Royle | 308—122 |

FOREIGN PATENTS

| | | |
|---|---|---|
| 1,266,160 | 12/1961 | France. |
| 840,751 | 7/1960 | Great Britain. |

DAVID J. WILLIAMOWSKY, *Primary Examiner.*

DON A. WAITE, *Examiner.*

L. L. JOHNSON, *Assistant Examiner.*